United States Patent
Tu et al.

(10) Patent No.: US 8,931,434 B2
(45) Date of Patent: Jan. 13, 2015

(54) COLLAPSIBLE BIRD FEEDER

(71) Applicant: Hua Tu, Homei Town, Changhwa (TW)

(72) Inventors: Hua Tu, Changhwa (TW); Kenneth W. Mann, Port Jefferson Station, NY (US)

(73) Assignee: Hua Tu, Homei Town, Changhwa (TW)

( * ) Notice: Subject to any disclaimer, the term of this patent is extended or adjusted under 35 U.S.C. 154(b) by 0 days.

(21) Appl. No.: 13/804,775

(22) Filed: Mar. 14, 2013

(65) Prior Publication Data

US 2014/0261200 A1    Sep. 18, 2014

(51) Int. Cl.
*A01K 39/00* (2006.01)
*A01K 39/01* (2006.01)

(52) U.S. Cl.
CPC ...................................... *A01K 39/01* (2013.01)
USPC ........................ 119/57.8; 119/51.01; 119/52.2

(58) Field of Classification Search
USPC ................ 119/51.01, 52.1, 52.2, 53, 57.8, 72
See application file for complete search history.

(56) References Cited

U.S. PATENT DOCUMENTS

| | | | | |
|---|---|---|---|---|
| 2,789,534 A | * | 4/1957 | Landgraf ...................... | 119/52.1 |
| D249,285 S | | 9/1978 | Podjan .......................... | D30/124 |
| 4,204,500 A | * | 5/1980 | Podjan .......................... | 119/57.8 |
| 4,747,370 A | * | 5/1988 | Olson ........................... | 119/52.2 |
| 5,975,015 A | * | 11/1999 | Runyon et al. ............... | 119/52.1 |
| 6,047,661 A | | 4/2000 | Lush ........................... | 119/51.01 |
| 6,073,582 A | | 6/2000 | Lush ........................... | 119/51.01 |
| 6,427,629 B1 | | 8/2002 | Lush ........................... | 119/52.1 |
| 6,866,004 B1 | | 3/2005 | Lush ........................... | 119/52.1 |
| 6,895,894 B2 | * | 5/2005 | Fort, II ......................... | 119/57.8 |
| 7,484,475 B2 | * | 2/2009 | Milliner ........................ | 119/52.1 |
| 7,610,875 B2 | * | 11/2009 | Webber ........................ | 119/57.8 |
| 8,245,666 B2 | * | 8/2012 | Sena et al. ................... | 119/57.8 |
| 2003/0200933 A1 | * | 10/2003 | Park ............................. | 119/57.8 |
| 2008/0156269 A1 | * | 7/2008 | Greenwood et al. ........ | 119/51.01 |
| 2009/0283044 A1 | * | 11/2009 | Black ........................... | 119/51.01 |
| 2010/0147222 A1 | * | 6/2010 | Vosbikian .................... | 119/52.2 |
| 2010/0300364 A1 | * | 12/2010 | Sena et al. ................... | 119/51.01 |
| 2012/0111278 A1 | * | 5/2012 | Greenwood et al. ......... | 119/52.2 |

* cited by examiner

*Primary Examiner* — Kimberly Berona
*Assistant Examiner* — Michael Wang
(74) *Attorney, Agent, or Firm* — Gerald T. Bodner

(57) ABSTRACT

A bird feeder includes a seed reservoir formed as two or more telescopic components, which are reducible in size when not in use and which may be telescopically expanded by the owner thereof when in use to define a full-length seed reservoir. The bottom end of the reservoir is received in a base having a conically-shaped seed spreader situated therein, and the upper section of the reservoir is mounted to the underside of a hemispherically-shaped, anti-squirrel dome.

13 Claims, 14 Drawing Sheets

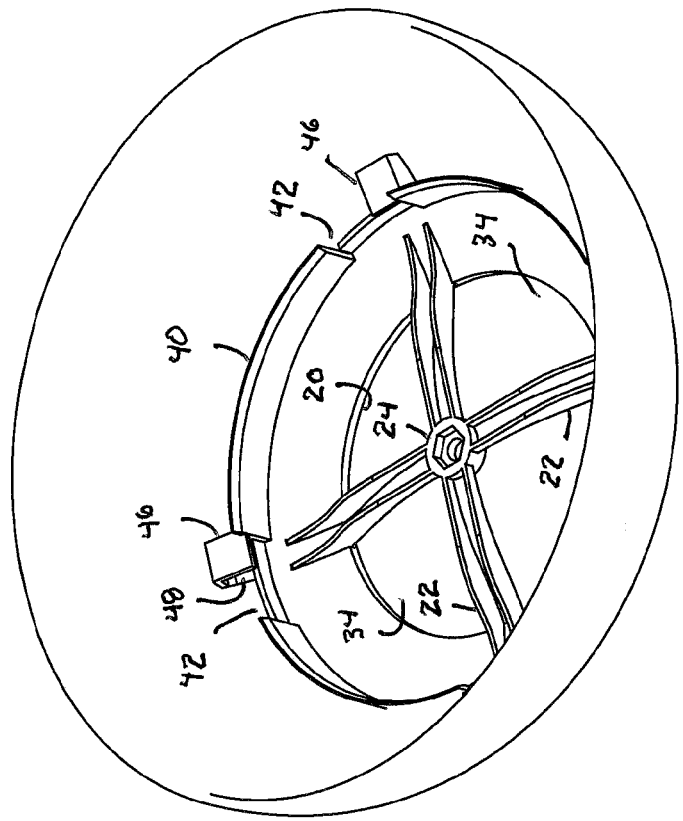
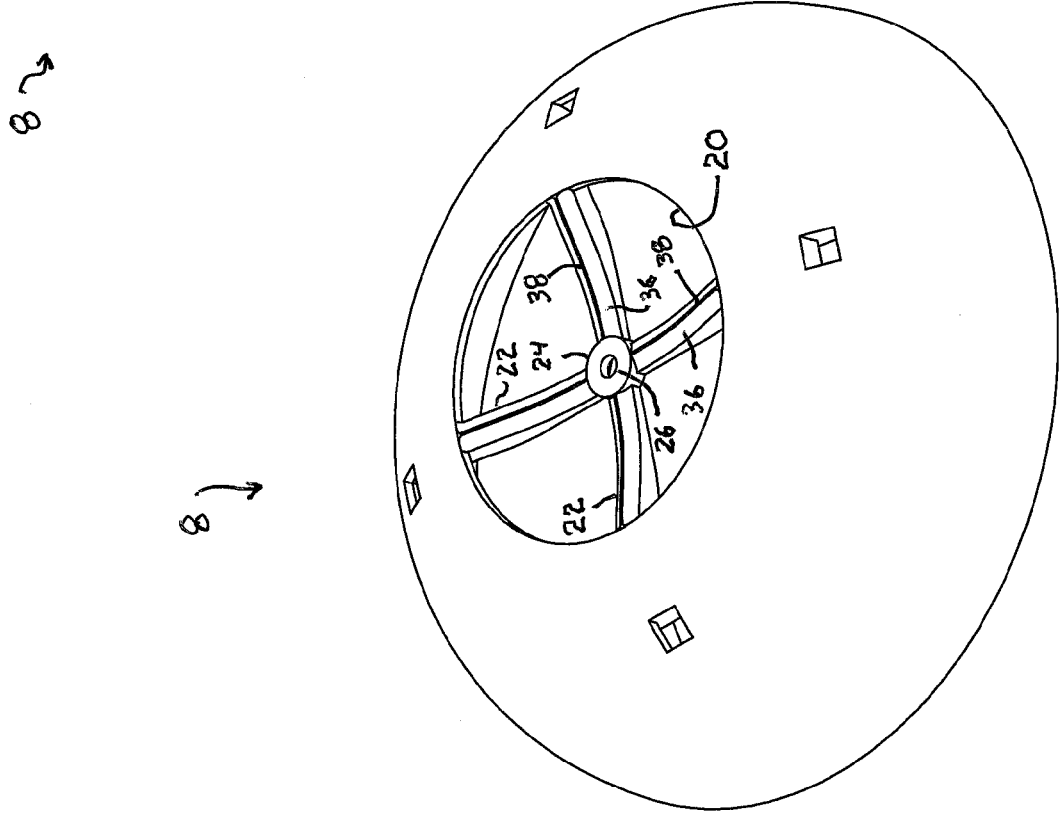
FIG. 9B
FIG. 9A

COLLAPSIBLE BIRD FEEDER

BACKGROUND OF THE INVENTION

1. Field of the Invention

The present invention generally relates to bird feeders, and more particularly relates to hanging bird feeders having reservoirs for receiving and holding a quantity of bird seed and further having some form of squirrel-deterrent structure.

2. Description of the Prior Art

Many conventional bird feeders include a refillable seed reservoir which is mounted on an open tray on which the seed is exposed for consumption by birds perched on the tray. One of the problems with such a conventional design is that the open tray is exposed to the elements, particularly wind and rain. Wind tends to blow the seed from the tray where it falls on the ground, creating an unsightly area and exposing the birds to the danger of predatory animals as they feed on the seed that has fallen to the ground. Furthermore, rain is captured by the tray and remains there, causing the seed to rot and congeal into a moldy mass. The rotted seed is inedible, and the bird feeder must be constantly emptied and cleaned, often requiring the seed occupying the reservoir to be discarded. Additionally, squirrels are very adept at finding ways to gain access to the seed in conventional bird feeders, and although home owners may marvel at their acrobatic feats and dogged determination in defeating squirrel-deterrent structures found on such conventional bird feeders, such efforts are not appreciated, as home owners would still prefer that their bird feeders be used to feed birds and not squirrels.

OBJECTS AND SUMMARY OF THE INVENTION

It is an object of the present invention to provide a bird feeder that minimizes the effect of rain and wind on seed held thereby.

It is another object of the present invention to provide a bird feeder that minimizes the ability of squirrels to gain access to the bird seed held thereby while allowing birds' free access to the seed.

It is still another object of the present invention to provide a bird feeder which may be compactly packaged by the manufacturer and which saves on shelf space when displayed by a retailer.

It is yet a further object of the present invention to provide a seed saver bird feeder which may be easily cleaned by an owner thereof.

In one form of the present invention, a bird feeder includes a seed reservoir formed as two or more telescopic components, which are reducible in size when not in use and which may be telescopically expanded by the homeowner when in use to define a full-length seed reservoir. The bottom end of the reservoir is received in a base having a conically-shaped seed spreader situated therein, and the upper portion of the reservoir is mounted to the underside of a hemispherically-shaped dome. The dome includes a hanger mounted thereon so that the bird feeder may be suspended from a tree branch or other supporting structure.

The base is partly enclosed so that the seed is not exposed to the elements as in conventional bird feeders having open trays. More specifically, the base includes an upper cover portion which is preferably circular in shape and having a sloping top wall in which is formed a plurality of openings spaced apart from one another periodically about the circumference of the upper cover portion. The dimensions of each aperture formed in the upper cover portion are such that only the head of a bird may be received thereby so that the bird may gain access to seed held within the interior cavity defined by the base. A squirrel's head would be too large to insert into the apertures and, therefore, a squirrel would be precluded from gaining access to the seed held by the bird feeder.

The bird feeder may further include a combination rain deflector/squirrel deterrent shield, which is formed as a disc-like member extending radially outwardly from the outer circumference of the seed reservoir, and situated on the reservoir between the dome and the base. Squirrels hanging from a tree branch on which the bird feeder is suspended would find not only the semi-hemispherical dome to be a deterrent, but would also encounter the rain deflector/squirrel deterrent shield in their attempt to reach the base of the bird feeder in which the seed is contained. Even if the squirrel were successful in reaching the base, it would not have access to the seed held within the confines of the base, as the apertures would be too small for the squirrel to insert its head therein.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 9A is a top perspective view of the dome forming part of the collapsible bird feeder of the present invention.

FIG. 9B is a bottom perspective view of the dome forming part of the collapsible bird feeder of the present invention.

DETAILED DESCRIPTION OF THE PREFERRED EMBODIMENTS

Figure 1:
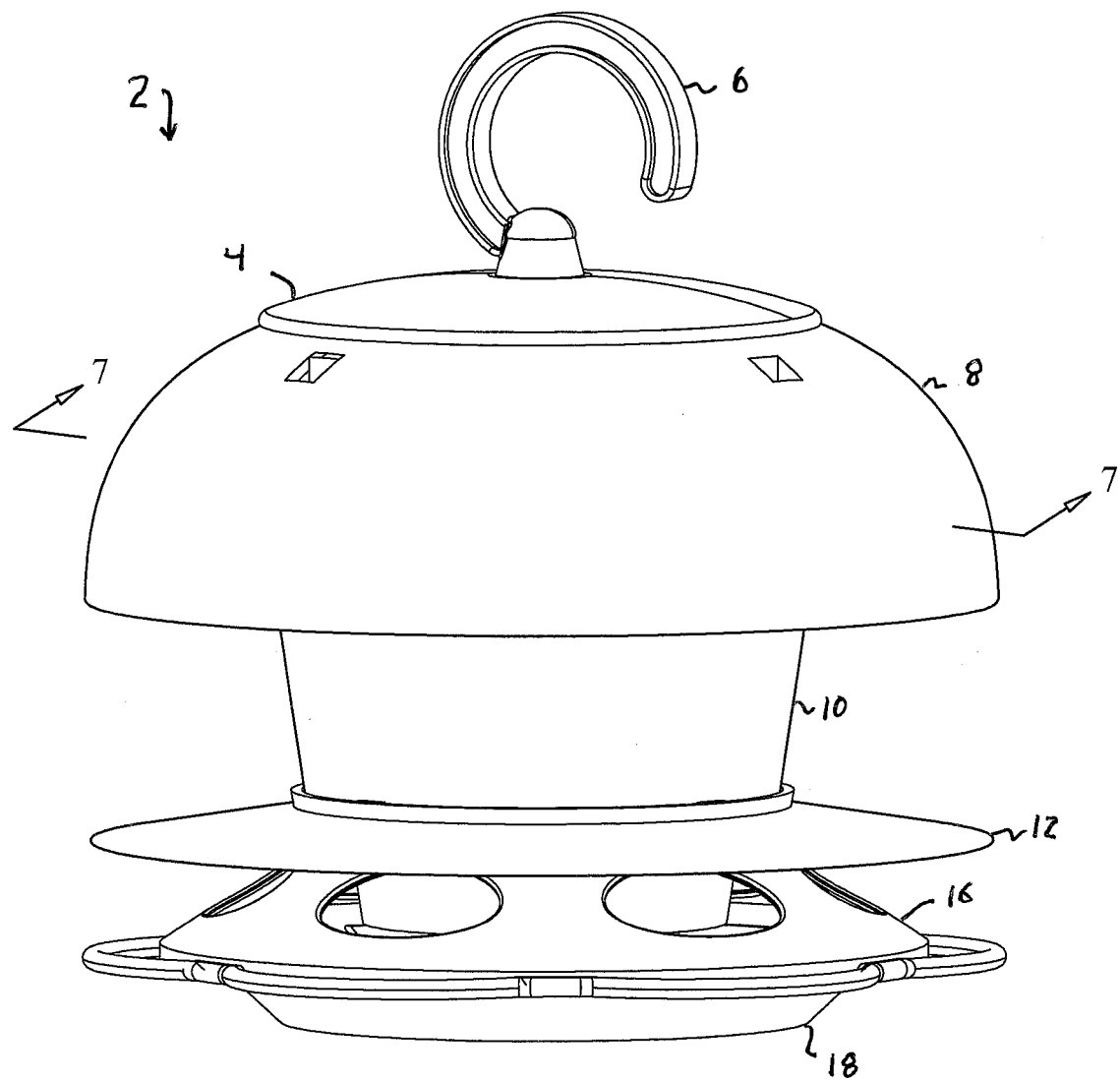
FIG. 1 is a perspective view of the collapsible bird feeder formed in accordance with the present invention in a compacted form for shipment by the manufacturer or display by the retailer.

In a preferred form, and as shown in FIGS. 1-14B of the drawings, the collapsible bird feeder 2 of the present invention includes seven basic components, described in order of location on the assembled bird feeder from top to bottom: a dome cap 4 with a molded-in hook 6; an anti-squirrel dome 8; an upper seed reservoir section 10; a rain deflector/ancillary squirrel deterrent shield 12; a lower seed reservoir section 14; an upper base tray cover 16; and a lower base tray 18. Each preferred component will now be described in detail.

The anti-squirrel dome 8 is a concave, hemispherically-shaped molded structure with a smooth outer surface, making it difficult for a squirrel attacking the bird feeder 2 to maintain its footing. A circular hole 20 is formed in the top portion of the dome 8 through which seed may be poured for filling the seed reservoir defined by the upper and lower seed reservoir sections 10, 14. A pair of cross members 22 diametrically bridge the fill hole 20 in the dome 8 and are spaced apart 90 degrees from each other.

The cross members 22 are joined to a hub 24 at the center of the fill hole 20. The hub 24 has formed through its thickness a central opening 26. The bottom side of the central opening 26 is hexagonally shaped, whereas the top side is cylindrical. A bolt 28 having a hexagonal head 30 and threaded cylindrical shank 32 is closely received by this central opening 26, with the head 30 being retained within the hexagonally-shaped bottom side of the central opening 26, and the threaded cylindrical shank 32 extending upwardly from the top side of the central opening 26 for mounting the dome cap 4 on the dome 8, as will be described in greater detail. The bolt 28 is prevented from rotating by the hexagonally-shaped bolt head 30 being closely received by the hexagonally-shaped bottom side of the central opening 26.

The cross members 22 extending across the fill hole 20 in the top of the dome 8 are preferably recessed, or bowed downwardly and inwardly of the fill hole, as can be seen in FIGS. 9A and 9B. The purpose for this particular bowed shape of the cross members 22 is to minimize the spillage of bird seed poured into the fill hole 20. Any seed deflected by the recessed cross members 22 will still flow through the apertures 34 between the cross members 22 and into the seed reservoir.

Also, the cross members 22 are preferably formed with tapered upper portions having sloped side walls 36 which meet in a top ridge 38, rather than the cross members having flat top surfaces. This tapered shape further enhances the flow of seed through the fill hole 20 in the dome 8 and into the seed reservoir, with little or no spillage of seed that is deflected by the cross members 22.

The inside surface of the anti-squirrel dome 8 is formed with a circular guide ring 40 extending outwardly therefrom. As will be seen, the guide ring 40 is used to guide the connection of the top portion of the upper seed reservoir section 10 to the dome 8. The guide ring 40 is broken in continuity at several, periodically spaced locations to define notches 42 through which may be received periodically spaced tabs 44 extending radially outwardly from the top portion of the upper seed reservoir section 10.

An L-shaped bracket 46, defining a slot 48, extends outwardly from the inside surface of the dome 8 and is situated adjacent to each break or notch 42 in the guide ring 40. As will be seen, the slots 48 defined by the L-shaped brackets 46 receive the tabs 44 of the upper seed reservoir section 10 to secure the upper seed reservoir section to the inside surface of the dome 8.

The dome cap 4, with its integrally formed hook 6, is removably mounted atop the anti-squirrel dome 8 to cover the fill hole 20. A boss 50 extends outwardly from the outer surface of the dome cap 4 to which the hook 6 is integrally mounted. The hook 6 is curved, and dimensioned to be large enough to fit onto a tree branch or other supporting structure to allow the assembled bird feeder 2 to hang by gravity therefrom, and to be easily removed therefrom for periodic cleaning of the bird feeder 2.

The dome cap 4 is preferably circular in shape, and slightly concavely curved, when viewed from its underside surface, to match the curvature of the outer surface of the anti-squirrel dome 8. The diameter of the cap 4 is selected so that the cap completely covers the fill hole 20 formed in the dome 8.

The boss 50 of the dome cap 4 has a bore 52 formed partially through its thickness from the underside surface of the dome cap 4. A threaded insert 54 is mounted in the bore 52.

The dome cap 4 is secured to the dome 8 by screwing it onto the bolt 28 extending upwardly from the dome 8, with the threaded shank 32 of the bolt 28 being received by the threaded insert 54 of the dome cap boss 50, so that preferably the underside surface of the dome cap 4 engages the outer surface of the dome 8 and completely covers the fill hole 20.

The dome cap securing bolt 28 may include a washer 56 to distribute any tightening forces over a large area of the hub 24 to prevent the hub from splitting, and a nut 58 to retain the bolt 28 to the hub 24 when the dome cap 4 is removed.

The seed reservoir, to hold bird seed therein, is formed from two (or more) telescopic components—an upper seed reservoir section 10 and a lower seed reservoir section 14. Preferably, each of the upper and lower seed reservoir sections 10, 14 is molded in clear plastic so that a user may easily see the volume of seed contained in the reservoir and ascertain whether the reservoir needs to be refilled.

Each of the upper seed reservoir section 10 and the lower seed reservoir section 14 is circular in cross-section and tapered axially, and includes open top and bottom axial ends. More specifically, each section 10, 14 has a diameter which decreases in an axial direction from its top portion to its opposite bottom portion.

The lower seed reservoir section 14 is received within the upper seed reservoir section 10 so that the lower section 14 extends axially outwardly beyond the bottom edge of the upper section 10. Both sections 10, 14 are formed with the same radial taper but with diameters of each section chosen such that the bottom portion of the upper seed reservoir section 10 overlaps and engages the top portion of the lower seed reservoir section 14 in a close, interference fit. The close engagement of the inner and outer surfaces respectively of the upper and lower sections 10, 14 prevents bird seed from passing between the two overlapping portions, so that the seed reservoir, formed from the telescopically extended upper and lower sections 10, 14, will serve to retain bird seed therein without seed leakage therefrom.

Figure 2:
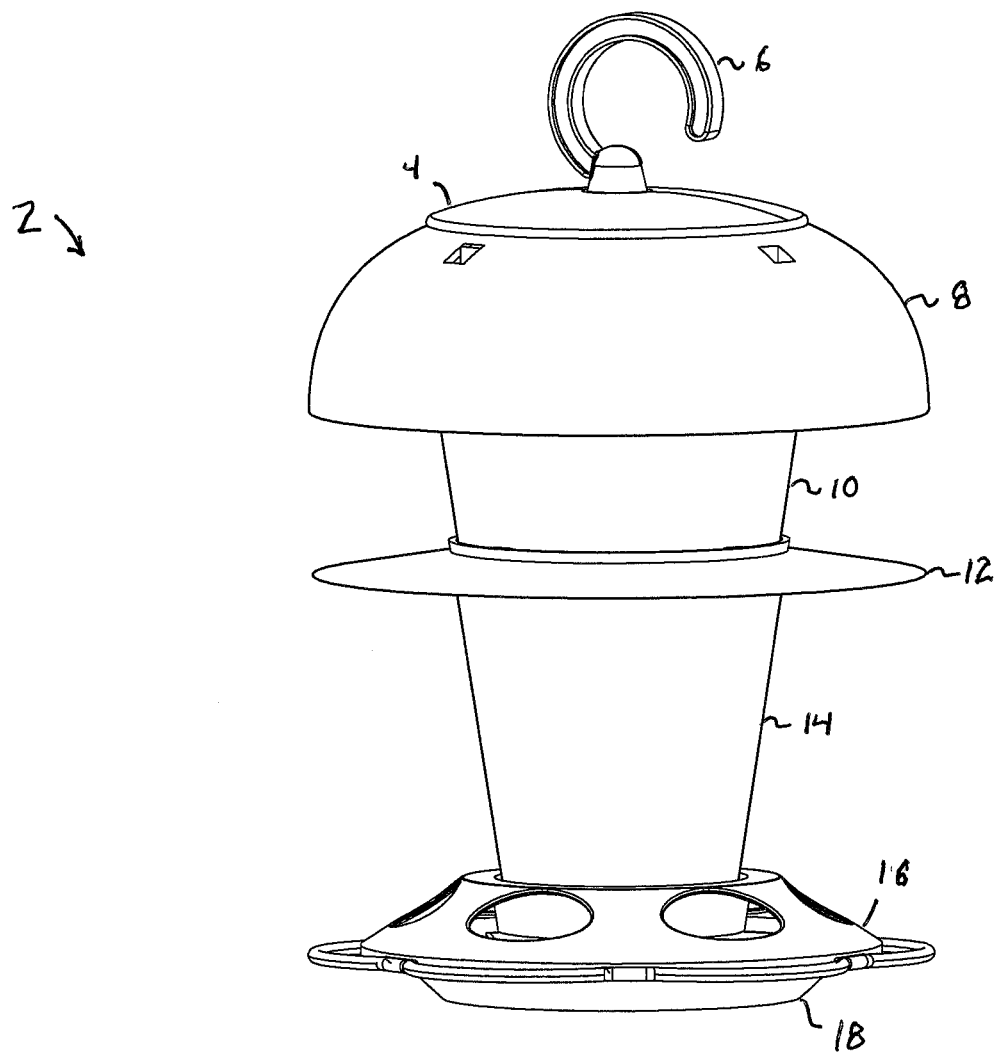
FIG. 2 is a perspective view of the collapsible bird feeder of the present invention shown in its expanded form for use by a home owner.
Figure 3:
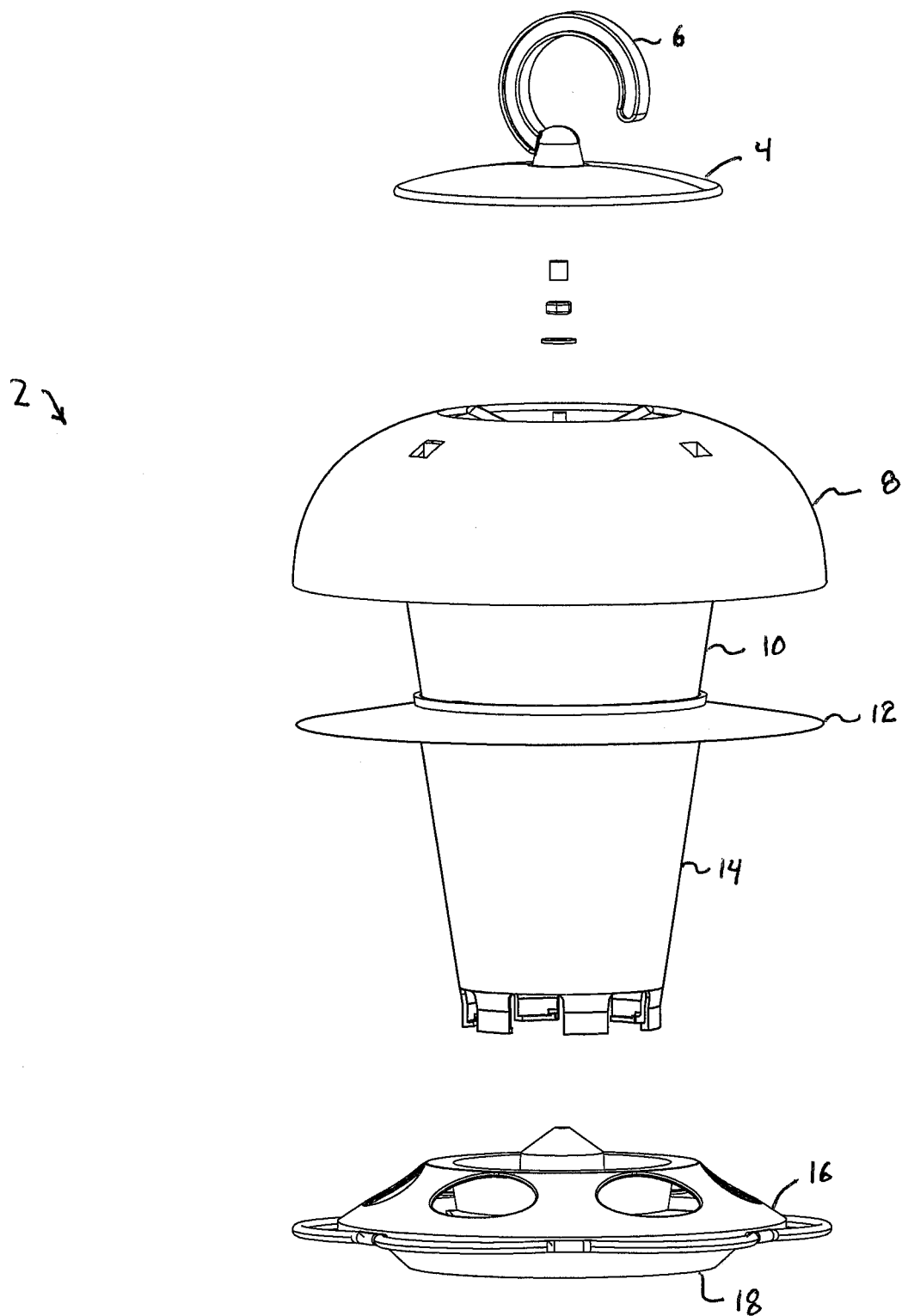
FIG. 3 is a partially exploded perspective view of the collapsible bird feeder of the present invention, and illustrating the various components of the bird feeder.
Figure 4:
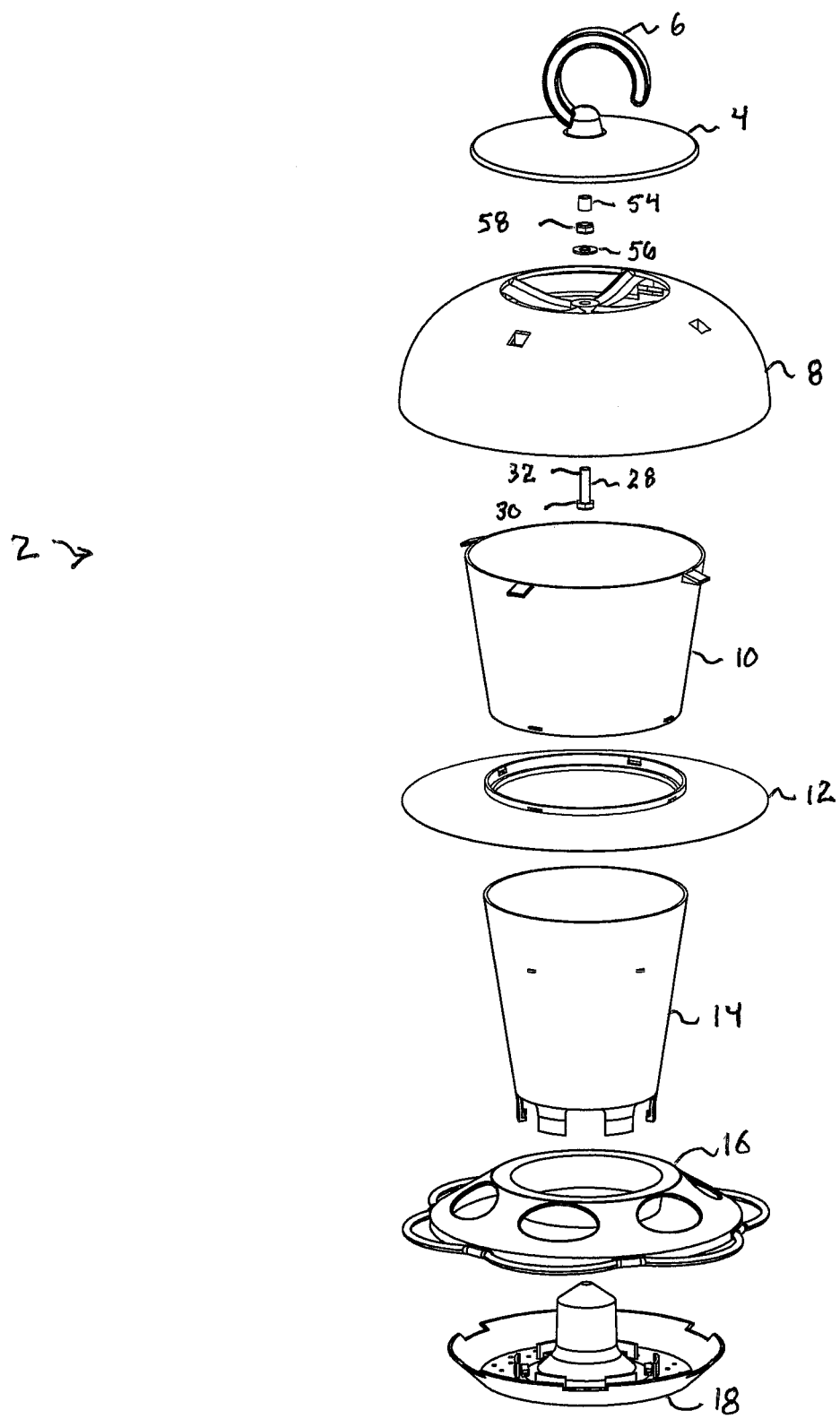
FIG. 4 is a fully exploded perspective view of the collapsible bird feeder of the present invention, and illustrating the various components of the bird feeder.
Figure 5:
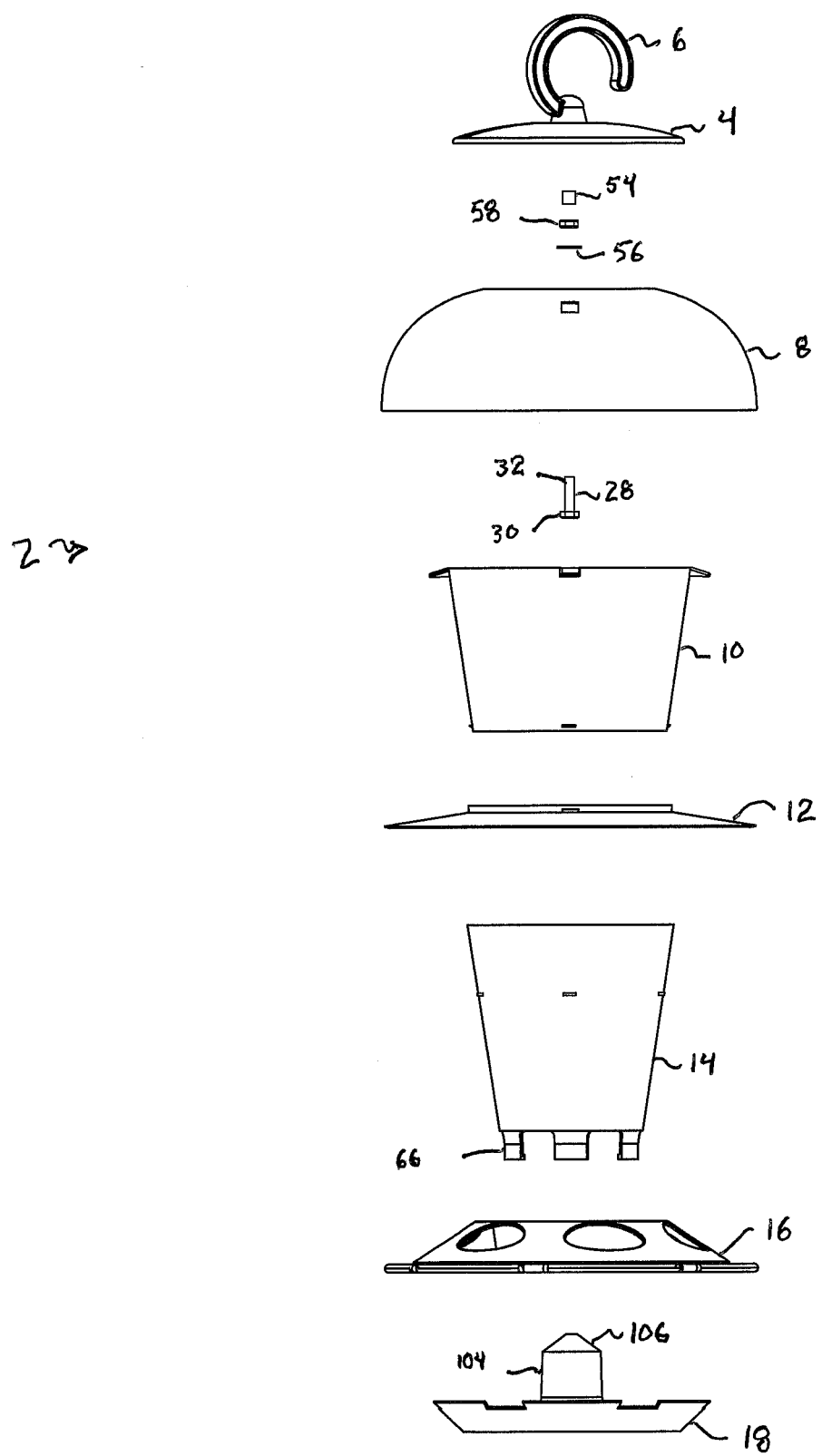
FIG. 5 is an exploded side elevation of the collapsible bird feeder of the present invention, and illustrating the various components of the bird feeder.
Figure 6:
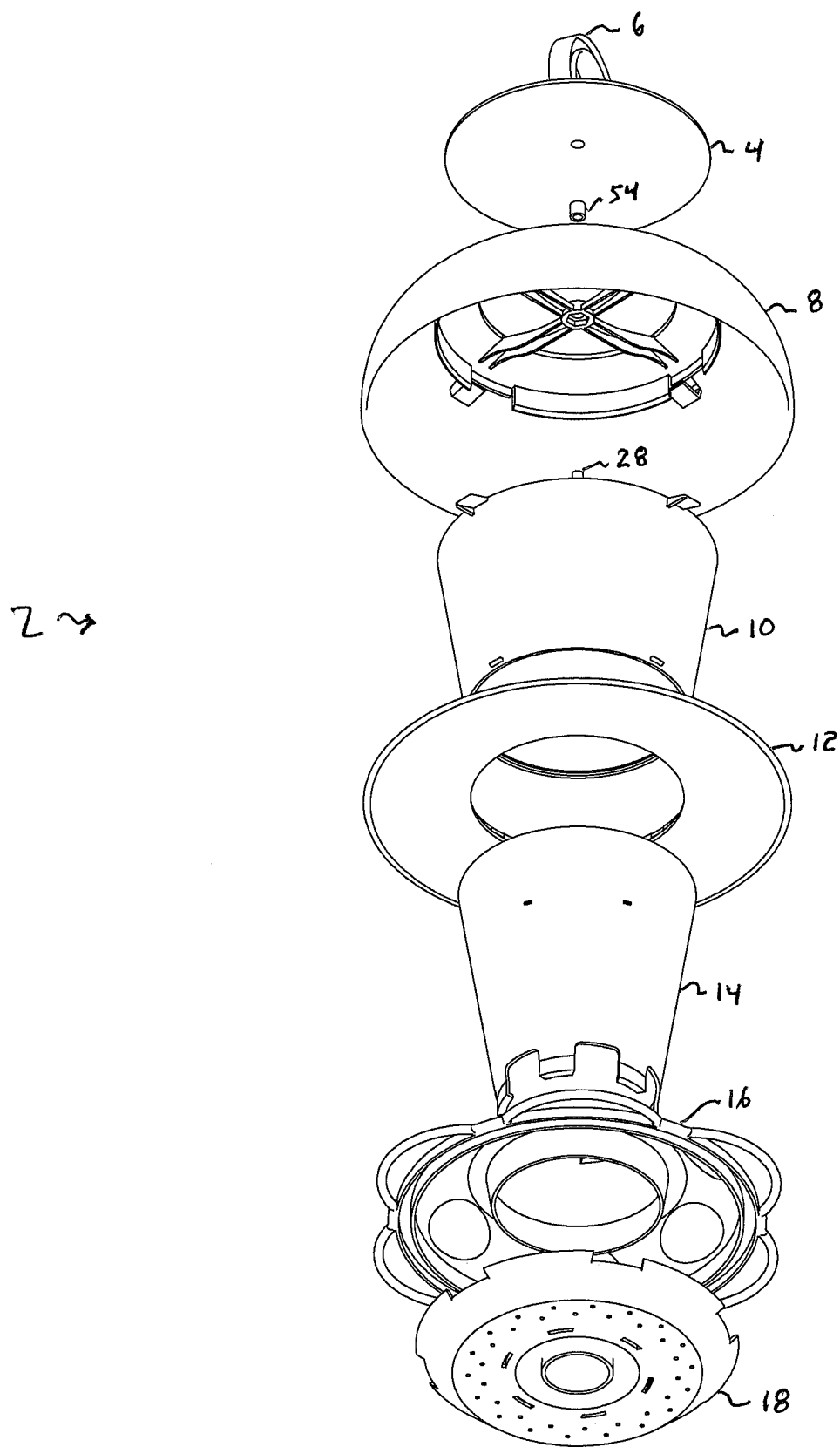
FIG. 6 is a fully exploded, bottom perspective view of the collapsible bird feeder of the present invention, and illustrating the various components of the bird feeder.
Figure 7:
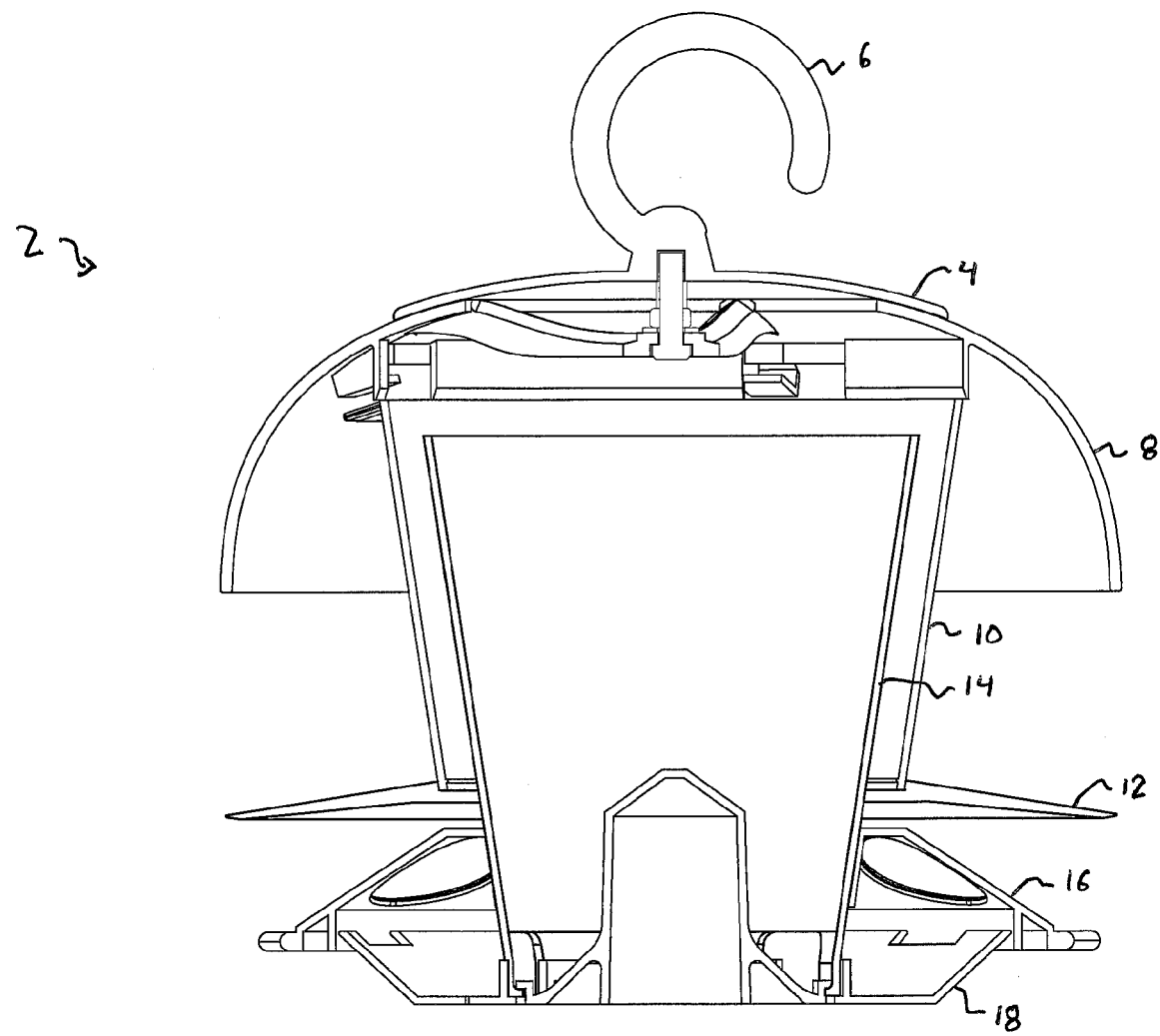
FIG. 7 is a cross sectional view of the collapsible bird feeder of the present invention shown in FIG. 1 in a collapsed state, taken along Line 7-7 of FIG. 1.
Figure 8B:
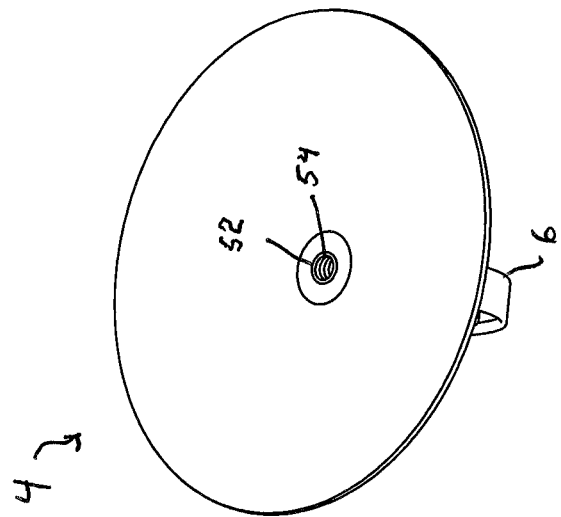
FIG. 8B is a bottom perspective view of the dome cap forming part of the collapsible bird feeder of the present invention.
Figure 8A:
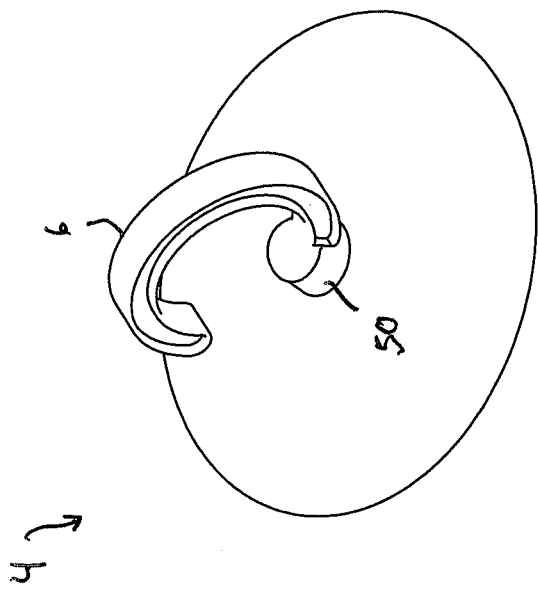
FIG. 8A is a top perspective view of the dome cap forming part of the collapsible bird feeder of the present invention.
Figure 10B:
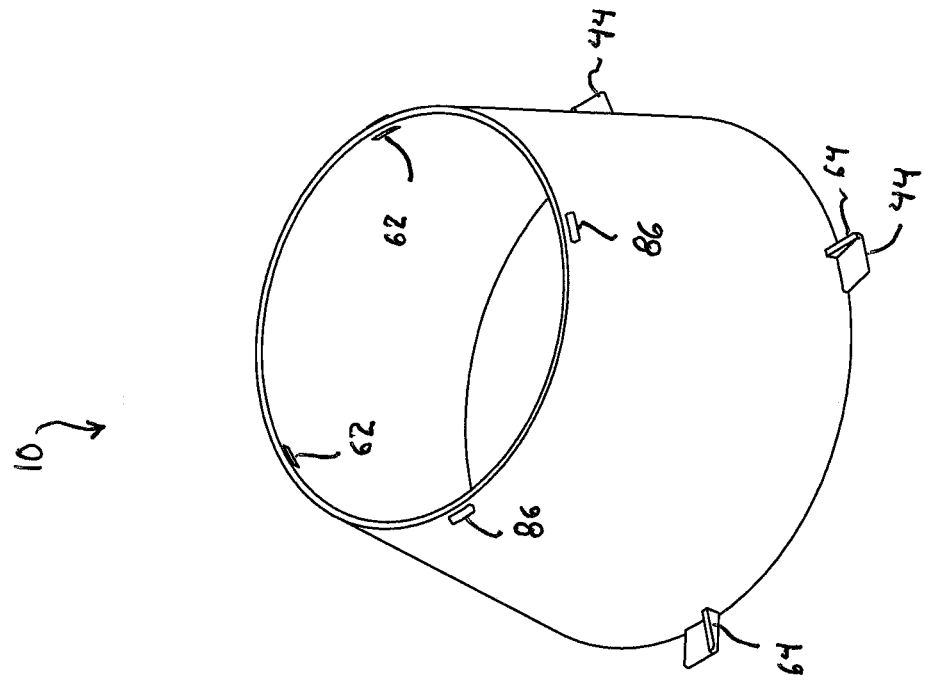
FIG. 10B is a bottom perspective view of the upper section of the seed reservoir forming part of the collapsible bird feeder of the present invention.
Figure 10A:
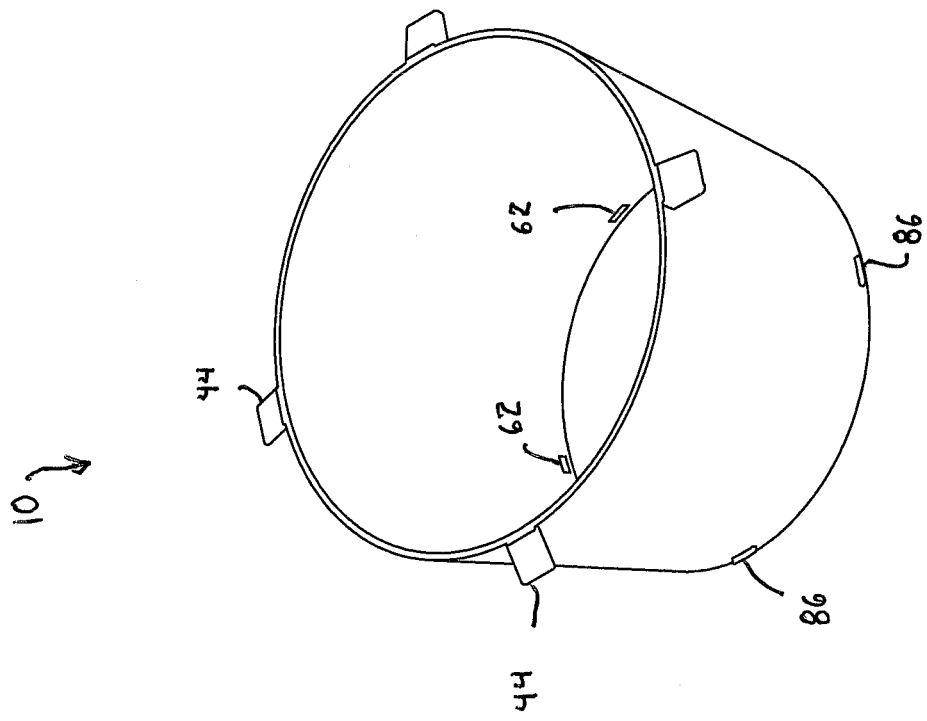
FIG. 10A is a top perspective view of the upper section of the seed reservoir forming part of the collapsible bird feeder of the present invention.
Figure 11B:
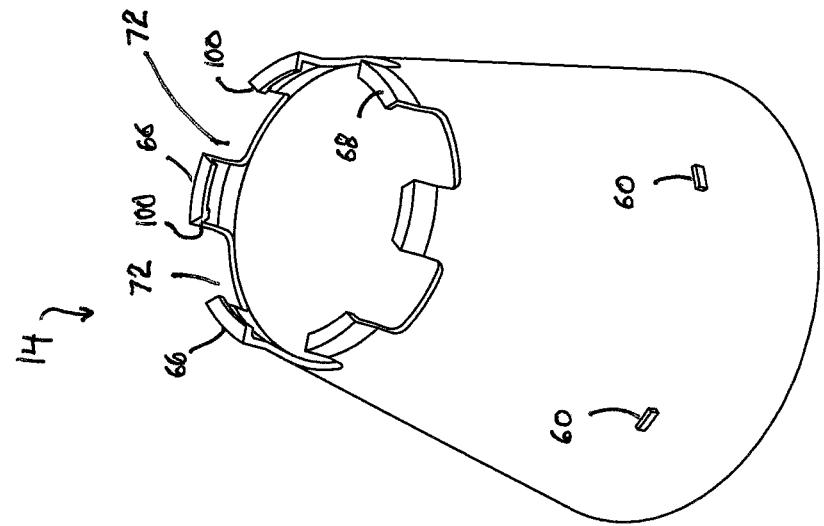
FIG. 11B is a bottom perspective view of the lower section of the seed reservoir forming part of the collapsible bird feeder of the present invention.
Figure 11A:
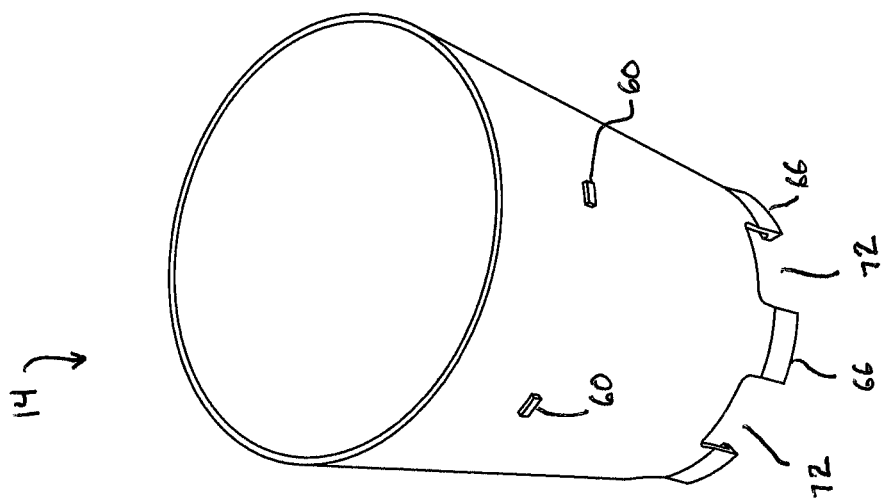
FIG. 11A is a top perspective view of the lower section of the seed reservoir forming part of the collapsible bird feeder of the present invention.
Figures 12A, 12B:
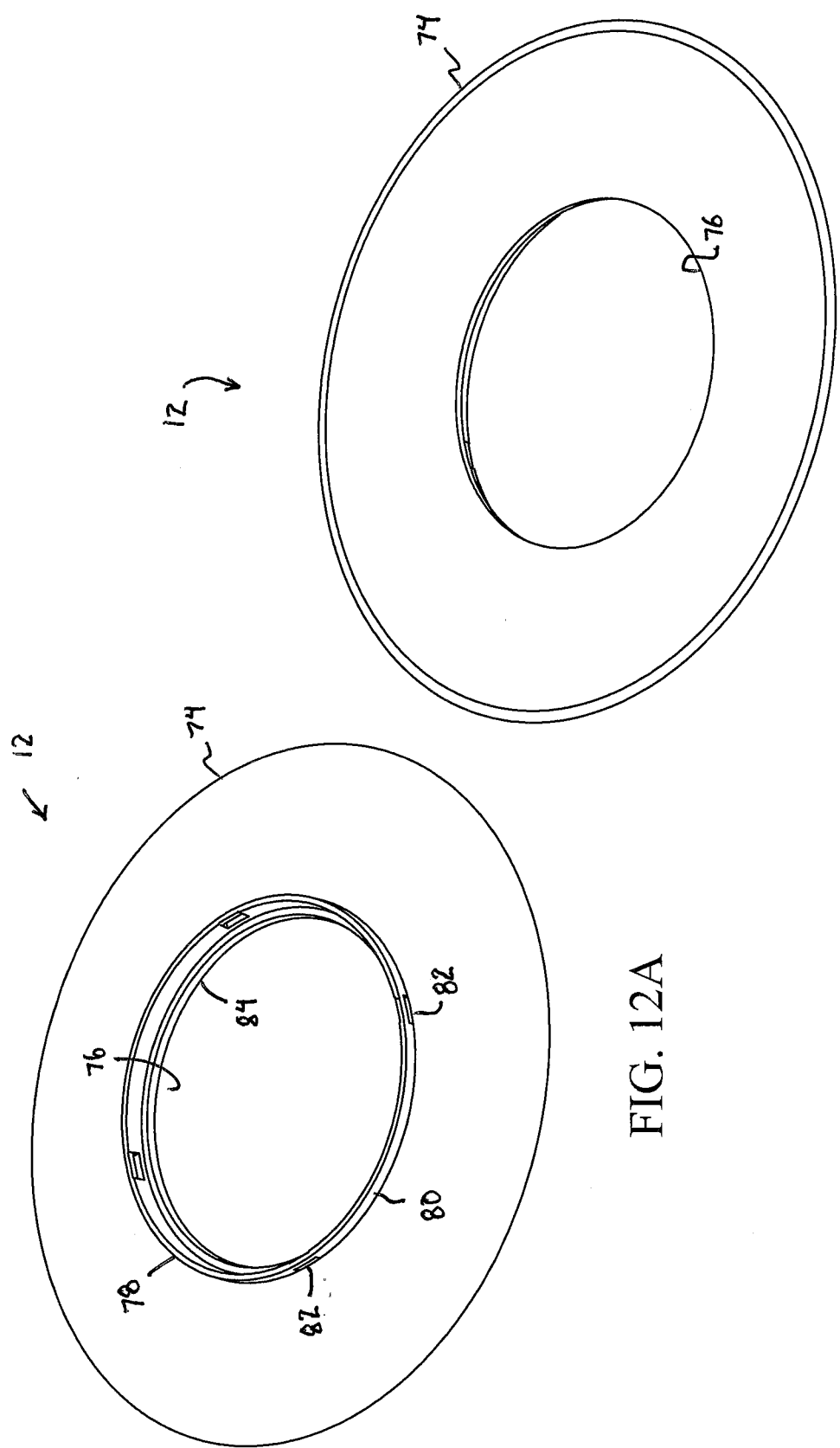
FIG. 12A is a top perspective view of the rain deflector/ancillary squirrel deterrent shield forming part of the collapsible bird feeder of the present invention.
FIG. 12B is a bottom perspective view of the rain deflector/ancillary squirrel deterrent shield forming part of the collapsible bird feeder of the present invention.
Figure 13B:
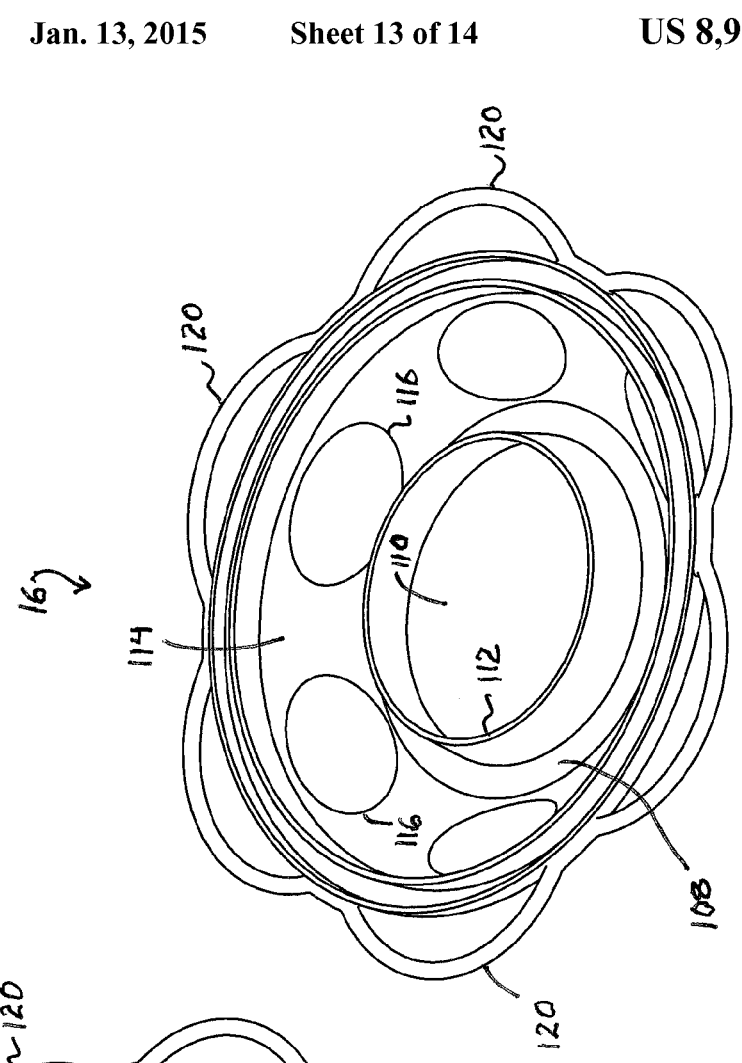
FIG. 13B is a bottom perspective view of the upper base cover forming part of the collapsible bird feeder of the present invention.
Figure 13A:
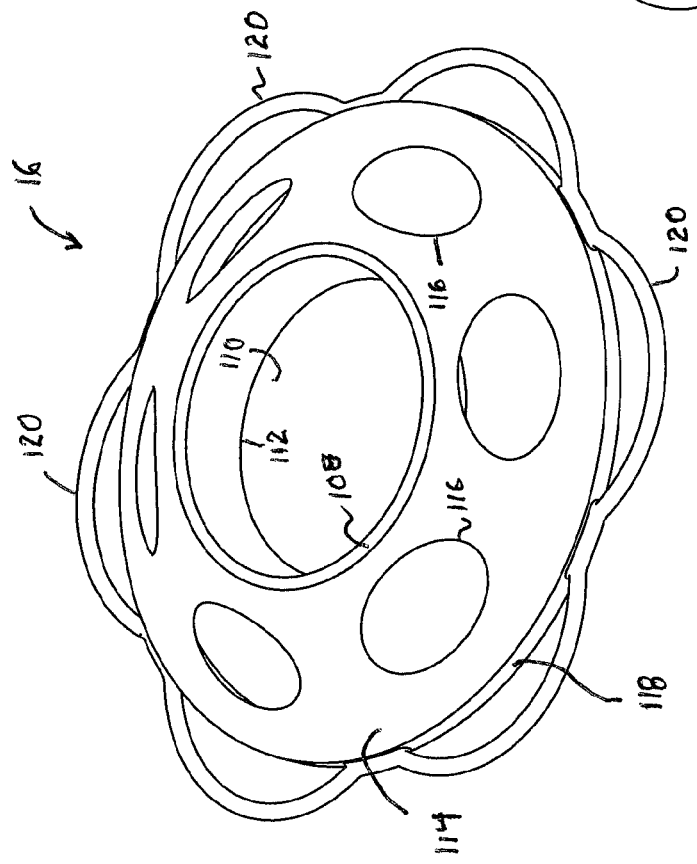
FIG. 13A is a top perspective view of the upper base cover forming part of the collapsible bird feeder of the present invention.
Figure 14B:
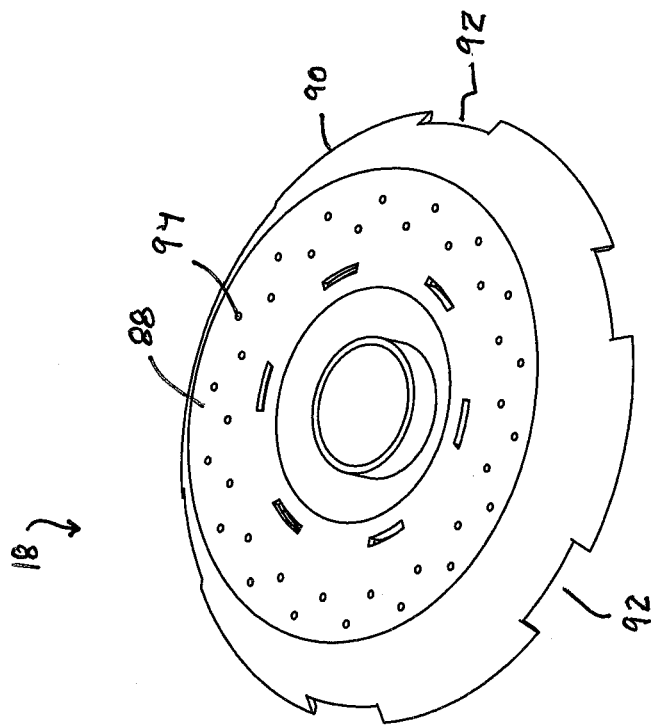
FIG. 14B is a bottom perspective view of the lower base tray forming part of the collapsible bird feeder of the present invention.
Figure 14A:
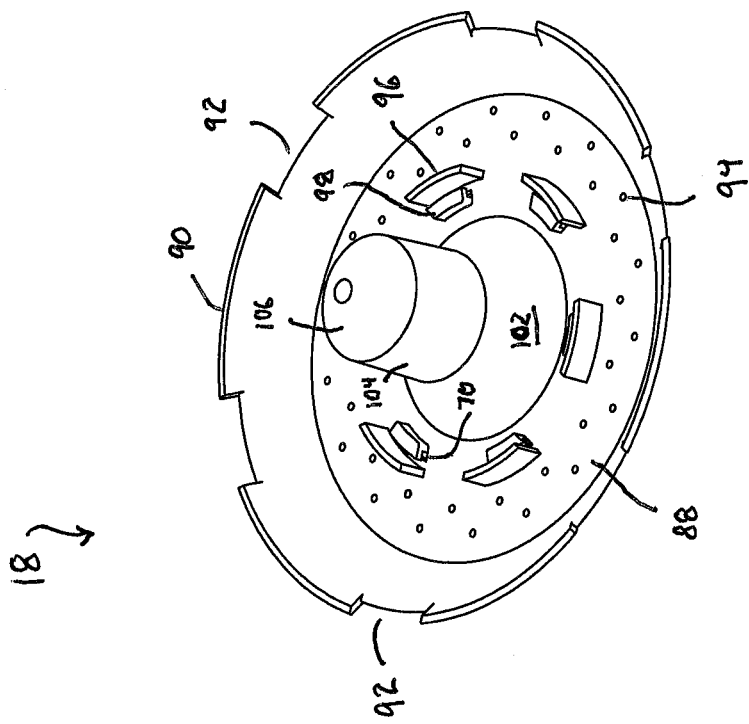
FIG. 14A is a top perspective view of the lower base tray forming part of the collapsible bird feeder of the present invention.

The seed reservoir of the bird feeder 2 of the present invention can hold a relatively high volume of bird seed so that the time between refills can be extended. The radius of the seed reservoir and its overall length are greater than many conventional bird feeders to accommodate this larger volume of seed, increasing the overall extended size of the bird feeder 2. Advantageously, however, because of its telescopic nature, the bird feeder 2 of the present invention may be packaged, shipped and displayed in a retail establishment in a collapsed state, such as shown in FIG. 1, with the lower seed reservoir section 14 unextended from the upper seed reservoir section 10, thereby costing less for packaging and shipping and requiring less retail shelf space. The upper and lower sections 10, 14 of the seed reservoir may be telescopically extended, such as shown in FIG. 2, by a purchaser of the bird feeder 2 when he is preparing it for use.

After a user purchases the bird feeder 2, and to lock the upper and lower sections 10, 14 of the seed reservoir in a fully telescopically extended state, the lower section 14 may include small protruding ribs 60 on its outer surface and spaced periodically about its circumference at an axial position near the top portion thereof where it overlaps the bottom portion of the upper section 10. The upper seed reservoir section 10 may include recesses, detents, openings or other cooperating structure 62 formed on its inner surface and situated near its bottom portion which overlaps the top portion of the lower section 14. The recesses, detents, openings or the like 62 are also spaced periodically about the circumference of the upper section 10 and so as to be in alignment with the periodically-spaced ribs 60 of the lower section 14.

When the upper and lower sections 10, 14 of the seed reservoir are fully extended, the protruding ribs 60 of the lower section 14 are received by corresponding recesses, detents, openings or the like 62 of the upper section 10 so that the two sections 10, 14 may be locked together in a fully extended state. Of course, it is envisioned to be within the scope of the present invention to switch the positions of the locking structures, that is, by having the protruding ribs 60 situated on the inside surface of the upper seed reservoir section 10 and the cooperating recesses, detents, openings and the like 62 being situated on the outer surface of the lower feed reservoir section 14.

As mentioned previously, the top portion of the upper seed reservoir section 10, very near its top edge, has a series of spaced apart tabs 44 extending radially from the outer surface thereof. These tabs 44 are provided for attaching the upper seed reservoir section 10 to the anti-squirrel dome 8 in a twist lock arrangement.

More specifically, the diameter of the guide ring 40 of the dome 8 is selected to be slightly greater than that of the top edge of the upper section 10 of the seed reservoir so that the upper section 10 may be received by the guide ring 40, with the outwardly extending tabs 44 being received in the notches 42 formed in the guide ring 40. The tabs 44 of the upper seed reservoir section 10 may be received by the slots 48 defined by the L-shaped brackets 46 and held captive thereby by rotating the upper section 10 slightly relative to the dome 8. Each tab 44 on the upper seed reservoir section 10 also includes a short vertical leg 64 extending perpendicularly from and on one lateral side of each tab 44. The legs 64 act as stops which contact the L-shaped brackets 46 of the dome 8 to prevent the upper section 10 from being overturned when the tabs 44 are received by the slots 48 of the dome 8.

The lower seed reservoir section 14 includes a plurality of spaced apart fingers 66 formed at its bottom portion. Each finger 66 includes a radially inwardly extending tab 68 which, as will be described in greater detail, are received by cooperating slots 70 formed in the seed tray 18 of the base to secure the base to the lower section 14 of the seed reservoir. There are cutouts 72 between adjacent fingers 66 that are formed in the lower seed reservoir section 14. These cutouts 72 are provided to allow seed contained in the reservoir to flow therethrough and into the seed tray 18 for distribution to feeding birds.

The bird feeder 2 of the present invention also preferably includes a rain deflector/ancillary squirrel deterrent shield 12. The shield 12 is formed as a disc-like member that is mounted on and surrounds the bottom edge of the upper seed reservoir section 10.

More specifically, the rain/squirrel shield 12 has a disc-like main body 74 having a relatively large central opening 76 formed through its thickness. Surrounding the opening 76 is a ring 78 having a relatively short side wall 80. Slots 82 are formed through the ring side wall 80 and periodically spaced about the circumference of the ring 78. Of course, detents, recesses and other structure may be used on the ring 78 instead of slots 82. Also surrounding the opening 76 and extending radially thereinto is a circular ledge 84.

A plurality of barbs 86 is formed near the bottom edge of the upper seed reservoir section 10. The barbs 86 are spaced apart from each other periodically about the circumference of the bottom edge, and protrude from the outer surface of the upper section 10. The spacing of the barbs 86 on the upper seed reservoir section 10 is chosen to match the spacing of the slots 82 formed in the wall 80 of the ring 78 of the rain/squirrel shield 12 so that corresponding barbs 86 and slots 82 may be in alignment.

The bottom edge of the upper seed reservoir section 10 is placed inside the ring 78 of the shield 12 so that it rests on the ledge 84 of the shield within the central opening 76. The barbs 86 of the upper section 10 are aligned with the slots 82 of the shield 12 and are lockingly received thereby. Thus, the cooperation of the barbs 86 and slots 82 secures the shield 12 in place on the upper seed reservoir section 10, with the bottom edge of the upper section 10 being received within the side wall 80 of the ring 78 and resting on the ledge 84 of the central opening 76 formed in the shield 12. The lower section 14 of the seed reservoir thus passes through the upper section 10 and the central opening 76 of the rain/squirrel shield 12 mounted thereon. The ledge 84 within the central opening 76 of the shield 12 does not extend radially inwardly beyond the inner surface of the upper seed reservoir section 10 so as not to interfere with the ability of the lower seed reservoir section 14 to extend telescopically beyond the bottom edge of the upper seed reservoir section 10.

The bird feeder 2 of the present invention also includes a base defined by an upper base cover 16 and a lower base tray 18. The lower base tray 18 will be described first.

The lower base tray 18 is generally circular in shape and has a bottom wall 88 and a sloped side wall 90 extending upwardly and radially outwardly from the bottom wall 88. The lower base tray 18 is provided for holding seed flowing from the open bottom of the seed reservoir and for uniformly distributing seed about its circumference to feeding birds. There are notches 92 that are formed in the upper edge of the outwardly sloped side wall 90 of the lower base tray 18 periodically about the circumference thereof. These notches 92 are provided to accommodate seed overflow from the lower base tray 18.

Also, the bottom wall 88 of the lower base tray 18 is perforated with a multiplicity of weep holes 94 formed through its thickness. The weep holes 94 are provided for water drainage to keep the seed in the tray 18 as dry as possible.

A plurality of intermittently-spaced arcuate walls 96 extends upwardly from the top surface of the bottom wall 88 of the lower base tray 18 and radially inwardly of the outwardly sloping side wall 90. Also, there is an L-shaped bracket 98 defining a slot 70 situated radially inwardly of, and in close proximity to, each of the arcuate walls 96. Each L-shaped bracket 98 is separated from an arcuate wall 96 to define a space therebetween for receiving a corresponding finger 66 formed in the bottom portion of the lower seed reservoir section 14.

The lower section 14 of the seed reservoir is secured to the lower base tray 18 in a twist lock arrangement. The fingers 66 are first aligned with the spaces between the adjacent arcuate walls 96 of the lower base tray 18, and the lower seed reservoir section 14 is rotated slightly relative to the tray 18 so that the fingers 66 are received between the L-shaped brackets 98 and the arcuate walls 96, and the tabs 68 on the fingers 66 are received by corresponding slots 70 formed by the L-shaped brackets 98.

Each tab 68 may include a shoulder or vertical end wall 100 on one of its lateral sides, which shoulder 100 acts as a stop by engaging an L-shaped bracket 98 to prevent over-rotation of the lower seed reservoir section 14 relative to the lower base tray 18 when the tabs 68 are received by the slots 70. Thus, the lower base tray 18 is secured to the lower seed reservoir section 14, but is easily removable therefrom for cleaning by turning the lower seed reservoir section 14 in an opposite direction.

The lower base tray 18 also includes a raised, conically-shaped shoulder 102 which surrounds a cylindrical boss 104 having a conically-shaped peak 106 on its upper free end, all of which is situated over the central portion of the bottom wall 88 and extending outwardly from the top surface thereof and at least partially into the lower seed reservoir section 14 attached to the lower base tray 18. The purpose of such structure (i.e., the conically-shaped shoulder 102, cylindrical boss 104 and conically-shaped peak 106) is to divert and evenly distribute seed contained in the reservoir about the circumference of the lower base tray 18, that is, to define a seed spreader. Seed contained in the reservoir is deflected by the conically-shaped peak 106 and surrounding shoulder 102 so as to flow by gravity through the apertures or cutouts 72 between the fingers 66 of the lower seed reservoir section 14, and through the space between adjacent arcuate walls 96 of the lower base tray 18, and is distributed thereby over most, if not all, of the top surface of the bottom wall 88, and contained therewithin by the outwardly sloping side wall 90. In this way, seed will be available for consumption by birds perched on any side of the base.

The base also includes an upper base cover 16, as mentioned earlier, which rests atop, and covers, the lower base tray 18. The cover 16 protects the seed in the tray 18 from adverse weather conditions, such as wind, rain, snow and the like.

The upper base cover 16 includes a flattened central wall portion 108, and a relatively large diameter opening 110 formed through the flattened central wall portion 108. A ring 112 surrounds and defines the central opening 110, and extends downwardly from the top surface of the flattened central wall portion 108. The ring 112 is tapered or sloped radially slightly inwardly of the central opening 110, such slope closely matching the slope or taper of the bottom portion of the lower section 14 of the seed reservoir so that, when the bottom portion of the lower seed reservoir section 14 is received by the central opening 110 of the upper base cover 16, the radially inner surface of the ring 112 surrounding the opening 110 closely engages the outer surface of the lower seed reservoir section 14. In this way, leakage of seed between the lower section 14 of the seed reservoir and the upper base cover 16, and penetration of rain water between the lower section 14 and the upper base cover 16, are minimized or prevented.

The upper base cover 16 further includes a sloping side wall 114 that extends downwardly and radially outwardly from, and surrounds, the flattened central wall portion 108. There are a plurality of feed ports 116 that are formed through the thickness of this sloping side wall 114 and spaced apart from each other about the circumference of the sloping side wall. Each feed port 116 may be circular, or oval, in shape, and preferably is dimensioned to accept the head of a feeding bird to allow the bird access to seed held by the lower base tray 18 under the protective base cover 16, but may be formed to be smaller than a typical squirrel's head to provide yet another obstacle or deterrent to a determined squirrel which somehow reaches the base of the bird feeder 2.

The sloping side wall 114 of the upper base cover 16 extends to a circular edge wall 118. A plurality of arcuately shaped perches 120 are provided, and each arcuately shaped perch 120 extends outwardly from this edge wall 118, each perch 120 being in alignment with a respective feed port 116 formed in the upper base cover 16 to allow a bird to perch thereon and access seed through the feed port 116.

The upper base cover 16 rests on the lower base tray 18, and is retained thereon when the lower seed reservoir section 14 is secured to the lower base tray 18.

The bird feeder 2 of the present invention minimizes the ability of squirrels to gain access to the bird seed held thereby while allowing birds free access to the seed. The bird feeder 2 also minimizes the effect of rain and wind on seed held by the feeder. Furthermore, because the bird feeder 2 is collapsible, it may be compactly packaged by the manufacturer, which saves on shipping costs and on shelf space when displayed by a retailer. Additionally, the bird feeder 2 of the present invention may be disassembled easily by the user for cleaning.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A collapsible bird feeder, which comprises:
   a seed reservoir for holding bird seed therein, the seed reservoir being formed of telescopically adjustable sections, the seed reservoir having an open top side for filling the reservoir with seed and an open bottom side situated axially opposite the open top side for dispensing seed held by the reservoir therethrough;
   a dome covering the open top side of the seed reservoir, the dome including a seed fill hole formed through the thickness thereof, the seed fill hole of the dome being positioned in alignment with the open top side of the seed reservoir;

a dome cap, the dome cap having a central portion and a bottom portion which extends outwardly from the central portion, the dome cap being mounted on the dome, with the bottom portion of the dome cap covering the seed fill hole formed in the dome; and a base, the base having a plurality of perch structures to support feeding birds, the base being situated below the open bottom side of the seed reservoir and being in seed flow communication therewith to receive seed held by the reservoir and dispensed through the open bottom side thereof;

wherein the seed reservoir is adjustable between at least a first state in which the telescopically adjustable sections of the reservoir are expanded relative to one another to provide the seed reservoir with a first axial length, and a second state in which the telescopically adjustable sections of the seed reservoir are contracted relative to one another to provide the seed reservoir with a second axial length which is less than the first axial length, the bird feeder being in a collapsed state when the seed reservoir has the second axial length, the bird feeder being in a non-collapsed state when the seed reservoir has the first axial length;

wherein the dome cap further includes a hook for hanging the bird feeder from a supporting structure, the hook being mounted on the central portion of the dome cap and extending outwardly therefrom;

wherein the dome includes a hub situated centrally in the seed fill hole formed therein and at least one cross member connected to the hub and bridging the seed fill hole;

wherein the central portion of the dome cap is removably mounted to the hub of the dome;

wherein the dome includes an outer surface portion defining the seed fill hole;

wherein the at least one cross member bridging the seed fill hole in the dome is recessed below the outer surface portion of the dome which defines the seed fill hole and is bowed downwardly and inwardly of the fill hole to minimize the spillage of bird seed poured into the fill hole of the dome; and wherein the at least one cross member which bridges the seed fill hole formed in the dome includes sloped side walls and a top ridge defined by the sloped side walls to minimize the spillage of bird seed that is poured into the fill hole of the dome.

2. A collapsible bird feeder as defined by claim 1, wherein the seed reservoir includes an upper section and a lower section, the upper section and the lower section being telescopically adjustable axially relative to one another to provide the seed reservoir with the first axial length and the second axial length.

3. A collapsible bird feeder as defined by claim 2, wherein the upper section of the seed reservoir includes the open top side, and the lower section of the seed reservoir includes the open bottom side; and wherein the lower section of the seed reservoir is receivable within the upper section of the seed reservoir.

4. A collapsible bird feeder as defined by claim 2, wherein a portion of the upper section of the seed reservoir overlaps a portion of the lower section of the seed reservoir; and wherein the overlapping portion of the upper section and the overlapping portion of the lower section include cooperating structure which retains the seed reservoir in the expanded, first state.

5. A collapsible bird feeder as defined by claim 4, wherein the cooperating structure on the overlapping portion of the upper section includes at least one of a protrusion and a protrusion receiving opening formed on a surface thereof; and wherein the cooperating structure of the overlapping portion of the lower section of the seed reservoir includes at least one of a protrusion receiving opening and a protrusion formed on a surface thereof.

6. A collapsible bird feeder as defined by claim 2, wherein the dome is generally hemispherical in shape.

7. A collapsible bird feeder as defined by claim 1, which further comprises:

a rain deflector, the rain deflector having a disk-shaped member which encircles the seed reservoir, the disk-shaped member having a central opening through which the seed reservoir is received, the disk-shaped member extending radially outwardly from the seed reservoir to overhang at least a portion of the base.

8. A collapsible bird feeder as defined by claim 1, wherein the base includes a lower base tray and an upper base cover disposed over the lower base tray, the lower base tray having a bottom wall and a side wall connected to the bottom wall and extending about the periphery thereof, the lower base tray being capable of holding seed on the bottom wall thereof dispensed from the seed reservoir; and wherein the upper base cover has a plurality of feed ports formed through the thickness thereof and spaced apart from each other circumferentially about the upper base cover to allow feeding birds access to the seed held by the lower base tray under the upper base cover.

9. A collapsible bird feeder as defined by claim 8, wherein the bottom wall of the lower base tray has formed through the thickness thereof a plurality of weep holes provided for water drainage.

10. A collapsible bird feeder as defined by claim 8, wherein the lower base tray includes means for spreading seed about the bottom wall of the lower base tray, the seed spreading means being mounted on the bottom wall of the lower base tray and extending upwardly therefrom.

11. A collapsible bird feeder as defined by claim 10, wherein the means for spreading seed includes a cylindrical member extending upwardly from the bottom wall of the lower base tray and into the open bottom side of the seed reservoir, the cylindrical member having a free end, the free end being conically shaped.

12. A collapsible bird feeder as defined by claim 8, wherein the seed reservoir includes a plurality of fingers extending circumferentially about the bottom open side thereof, adjacent fingers being spaced apart from each other to define therebetween cutouts to allow seed contained in the reservoir to flow therethrough and onto the lower base tray.

13. A collapsible bird feeder as defined by claim 1, wherein the dome is formed as a concave, hemispherically-shaped molded structure having a smooth outer surface.

* * * * *